US009601142B1

(12) United States Patent
Jury et al.

(10) Patent No.: US 9,601,142 B1
(45) Date of Patent: Mar. 21, 2017

(54) MAGNETIC RECORDING TRACKS WITH CONSOLIDATED TIMING FIELDS AND NO INTER-SECTOR GAPS

(71) Applicant: Seagate Technology LLC, Cupertino, CA (US)

(72) Inventors: Jason C. Jury, Apple Valley, MN (US); Xiong Liu, Singapore (SG); Quan Li, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/171,847

(22) Filed: Jun. 2, 2016

(51) Int. Cl.
*G11B 5/09* (2006.01)
*G11B 5/596* (2006.01)
*G11B 20/18* (2006.01)
*G11B 20/12* (2006.01)
*G11B 20/14* (2006.01)

(52) U.S. Cl.
CPC ...... *G11B 5/59688* (2013.01); *G11B 20/1217* (2013.01); *G11B 20/14* (2013.01); *G11B 20/1833* (2013.01); *G11B 2020/1238* (2013.01); *G11B 2020/1292* (2013.01)

(58) Field of Classification Search
CPC ............ G11B 5/59633; G11B 5/59655; G11B 5/59688; G11B 20/1426; G11B 20/1411; G11B 27/3027; G11B 2220/90; G11B 5/012; G11B 27/34
USPC .................. 360/44, 48, 72.1, 77.08
See application file for complete search history.

(56) References Cited

U.S. PATENT DOCUMENTS

| 5,523,903 | A | 6/1996 | Hetzler et al. |
| 5,818,654 | A | 10/1998 | Reddy et al. |
| 5,940,862 | A | 8/1999 | Erickson et al. |
| 5,995,308 | A | 11/1999 | Assouad et al. |
| 6,072,649 | A | 6/2000 | Park et al. |
| 6,167,461 | A | 12/2000 | Keats et al. |
| 6,493,173 | B1 | 12/2002 | Kim et al. |
| 7,405,893 | B2 * | 7/2008 | Bi ...................... G11B 5/59655 360/48 |
| 7,643,235 | B2 | 1/2010 | Erden et al. |
| 7,969,676 | B2 | 6/2011 | Buch et al. |

(Continued)

FOREIGN PATENT DOCUMENTS

| EP | 0631277 A2 | 12/1994 |
| WO | 98/14939 A1 | 4/1998 |

*Primary Examiner* — Nabil Hindi
(74) *Attorney, Agent, or Firm* — Hall Estill Attorneys at Law

(57) ABSTRACT

Method and apparatus for storing and retrieving user data from magnetic recording tracks in a data storage device. In some embodiments, a rotatable data recording medium has a circumferentially extending data track formed from spaced apart embedded servo wedges that extend radially across a recording surface of the medium to define intervening data wedges between each adjacent pair of the servo wedges. Each data wedge along the data track has only a single timing field at a beginning portion of the data wedge immediately adjacent a first servo wedge, followed by a plurality of data sectors that extend across the data wedge to an end portion of the data wedge immediately adjacent a second servo wedge. No inter-sector gaps are provided between the respective data sectors and no additional timing fields are provided between the first and second servo wedges.

20 Claims, 4 Drawing Sheets

(56) References Cited

U.S. PATENT DOCUMENTS

| 8,861,117 | B2 | 10/2014 | Shaver et al. |
| 9,275,676 | B2 | 3/2016 | Buch et al. |
| 2010/0128384 | A1 | 5/2010 | Shibano |

* cited by examiner

SERVO FIELD FORMAT

DATA FIELD (SECTOR FORMAT)

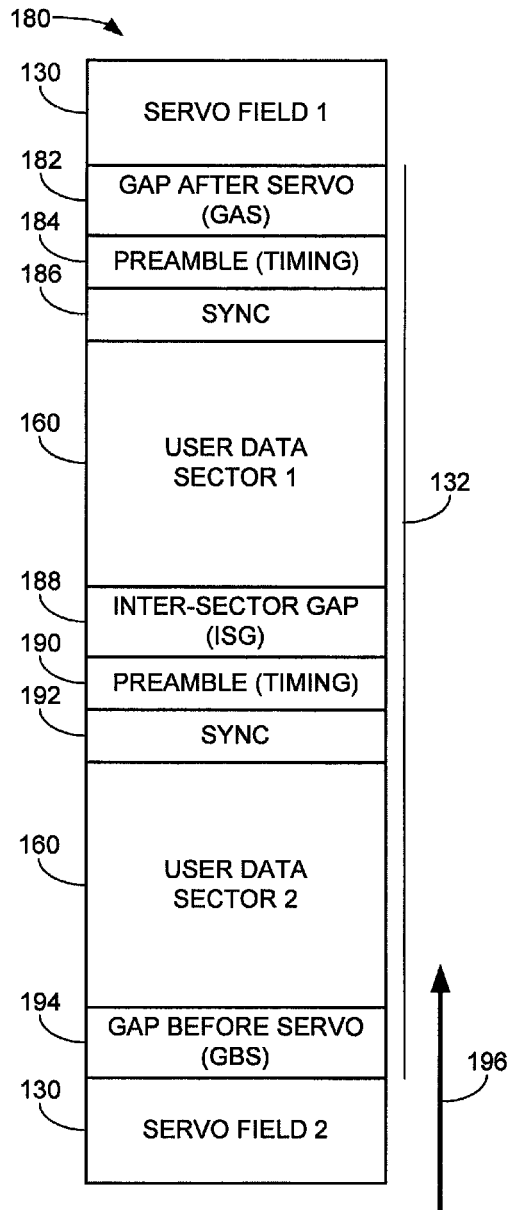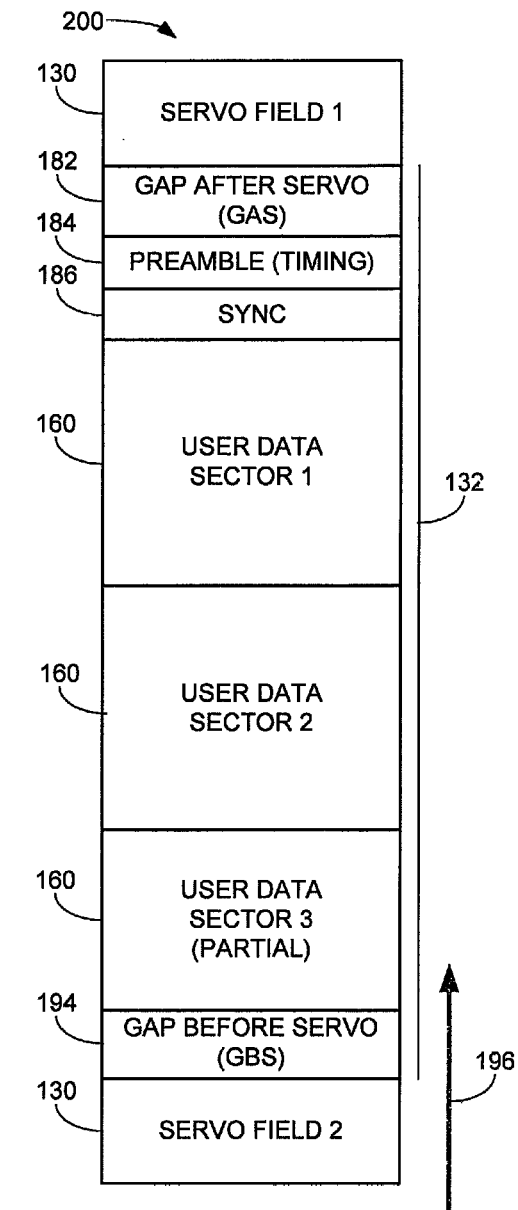
FIG. 7
Related Art
FIG. 8

MAGNETIC RECORDING TRACKS WITH CONSOLIDATED TIMING FIELDS AND NO INTER-SECTOR GAPS

SUMMARY

Various embodiments of the present disclosure are generally directed to a method and apparatus for storing and retrieving user data from magnetic data recording tracks in a data storage device.

In some embodiments, an apparatus includes a rotatable data recording medium with a circumferentially extending data track formed from spaced apart embedded servo wedges that extend radially across a recording surface of the medium to define intervening data wedges between each adjacent pair of the servo wedges. Each data wedge along the data track has only a single timing field at a beginning portion of the data wedge immediately adjacent a first servo wedge, followed by a plurality of data sectors that extend across the data wedge to an end portion of the data wedge immediately adjacent a second servo wedge. No inter-sector gaps are provided between the respective data sectors and no additional timing fields are provided between the first and second servo wedges.

In other embodiments, a data storage device has a rotatable data recording medium on which is defined a plurality of concentric data tracks, each track having a plurality of spaced apart servo fields and a data wedge between each adjacent pair of the servo fields. A data read/write transducer adjacent the medium has separate read and write elements. A control circuit is configured to direct, via the transducer, a writing of user data to and a reading of user data from a plurality of data sectors defined in each servo wedge. The control circuit includes a timing recovery circuit configured to establish a data transfer clock at a selected frequency responsive to a fixed frequency timing pattern stored in a single timing field in each data wedge. Each of the data sectors in each data wedge immediately following the timing field is immediately adjacent with no inter-sector gaps between the respective data sectors and no additional timing fields between the first and second servo fields.

In further embodiments, a method includes writing user data to a data track on a rotating data recording medium in a plurality of immediately adjacent fixed sized user data sectors in a data wedge along the data track between an adjacent pair of servo fields, the data wedge having only a single timing field with a oscillating pattern at a selected frequency between the adjacent pair of servo fields, the user data sectors immediately adjacent one another without inter-sector gaps formed therebetween and formed of data bits written at the selected frequency.

These and other features of various embodiments can be understood with a review of the following detailed description in conjunction with the accompanying drawings.

BRIEF DESCRIPTION OF DRAWINGS

FIG. 7 illustrates a format for a data track in accordance with the related art.

FIG. 8 illustrates a format for a data track of the SMR data tracks of FIG. 6 in accordance with some embodiments.

DETAILED DESCRIPTION

Figure 1:
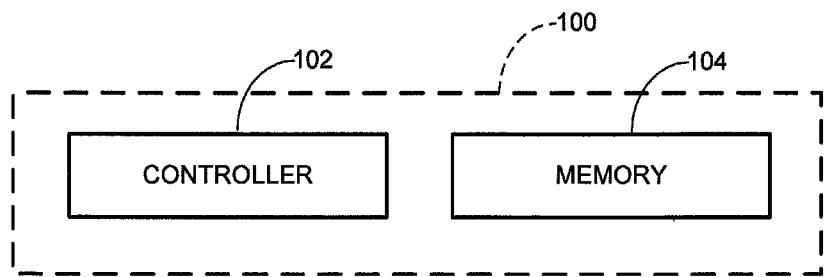
FIG. 1 is a simplified functional block diagram of a data storage device constructed and operated in accordance with various embodiments of the present disclosure.

The present disclosure is generally directed to data storage systems, and more particularly to storing and retrieving user data from magnetic recording tracks in a data storage device, including but not limited to shingled magnetic recording (SMR) tracks.

Data storage devices store and retrieve data from a host device in a fast and efficient manner. Such devices are often provided with a top level control circuit (controller) and one or more forms of data storage media, such as rotatable magnetic recording media (discs) in hard disc drives (HDDs) or solid-state memory cells in solid-state drives (SSDs).

HDDs generally arrange the rotatable magnetic recording media so as to rotate at a constant angular velocity. A corresponding array of data read/write transducers (heads) move across the recording surfaces of the media to write and read data to fixed sized sectors arranged along concentric data tracks. Embedded servo data may be supplied on the recording surfaces to provide positional information used by a servo control circuit to maintain the transducers in a desired relation to the data tracks. The servo data may be arranged as spaced apart servo wedges that extend radially across the discs. Each wedge is formed from a number of radially adjacent servo fields.

Data sectors and other control fields can be defined during a formatting operation in the spaces ("data wedges" or "gaps") between adjacent pairs of the servo fields at a given radius to provide a series of concentric tracks. The data sectors are arranged to store a fixed amount of user data, such as 512 bytes. The data sectors may store additional information, such as logical address information associated with the user data (e.g., logical block addresses, or LBAs), error correction codes (ECC) to enable correction of readback bit errors, etc.

The servo data are prerecorded to the discs and are usually at a fixed frequency. The data sectors are written at different, usually much higher frequencies that vary with respect to radius. Thus, each servo sector tends to include an automatic gain control (AGC) and synchronization (sync) type field to allow the system to both identify each servo sector as well as to set timing circuitry (e.g., a PLL VCO, etc.) to establish a read clock that can be used to read the servo data.

Once the head moves on from the servo sector, after a small gap after servo (GAS) interval, an AGC/Sync type field (preamble/syncmark type field) is provided at the beginning of the data wedge to enable the read clock to be adjusted to a suitable frequency for read operations within the data wedge. Thereafter, the data sectors are written at appropriate locations.

In current designs, it is common to place various control fields between the various data sectors in each data wedge. These can include interspersed phase lock loop (iPLL) timing fields and inter-sector gaps (ISGs). The timing fields enable the associated clock to be adjusted to correct for timing errors. The ISGs comprise gaps of a few symbols (e.g., 6 or so) to clearly separate and demarcate the individual sectors, etc. These and other forms of inter-wedge control fields allow the system to locate and operate upon (e.g., write or read) individual data sectors within the gap.

Some modern rotatable media storage devices employ so-called shingled magnetic recording (SMR) techniques. In SMR, data tracks are partially overwritten by successively written tracks so that a group of tracks are written as a band. SMR takes advantage of read sensors that have a narrower response than the write elements used to write the data. In this way, relatively wider tracks can be written and subsequently "trimmed" by successive tracks that remain wide enough to be reliably read by the read sensors. This further enhances format efficiencies on the media surfaces by allowing more tracks, and hence more data storage capacity, to be attained.

Various embodiments of the present disclosure are accordingly directed to an apparatus and method for writing data to a rotatable recording surface of a data storage device. As explained below, some embodiments generally provide a rotatable data recording medium having spaced apart embedded servo wedges that extend radially across a recording surface of the medium to define intervening data wedges between each adjacent pair of the servo wedges. Each data wedge has only a single timing field at a beginning portion of the data wedge immediately adjacent a first servo wedge and is arranged as an alternating pattern at a selected frequency. Following the timing field are a plurality of immediately adjacent abutting fixed sized data sectors that extend across the data wedge to an end portion of the data wedge immediately adjacent a second servo wedge. No intersector gaps are provided between the respective data sectors, and no additional timing fields are provided between the first and second servo wedges.

By eliminating the timing and ISG fields in each data wedge, each data wedge is filled with just data sectors after the initial timing field. It has been found that, in some cases, up to 3-4 or more additional data sectors can be added to each data track. In a device with many hundreds of thousands of tracks on each data recording surface, this can result in a substantial increase in overall data storage capacity for the surface.

One result of the elimination of the intermediate timing fields in each data wedge is that timing synchronization is established and maintained by the first (and only) timing field at the beginning of each wedge. The readback signal from the data on the track enables the system to maintain frequency lock across the entirety of the data wedge.

Another result from this configuration is that the system will generally read an entire data wedge during any particular read operation up to the desired sector. For example, if the system has requested a one sector read and the target sector is the fourth sector in the data wedge, the system will have to read each of the first four sectors and discard the readback data for the first three. But since heads are usually arranged on track by the time that a given data wedge containing a desired sector approaches and passes the head, this requirement comes with very little if any additional cost, apart from the need to perhaps, in some instances, carry out more aggressive seeks to ensure the head has settled onto the track prior to the leading servo field ahead of the target sector.

It is contemplated that each of the tracks formatted in this manner will be shingled magnetic recording (SMR) tracks, so that the tracks are written as bands of partially overlapping tracks. Such is merely exemplary, however, and is not necessarily required.

These and other features and considerations can be understood beginning with a review of FIG. 1, which provides a simplified representation of a data storage device 100 of the type used to store and retrieve user data from a host device. The host device can take the form of substantially any form of computer processing device adapted to communicate with the data storage device, including a computer, laptop, tablet, smart phone, gaming console, etc.

The data storage device 100 includes a controller (control circuit) 102 and a memory module 104. The controller 102 is a hardware or programmable processor based control circuit that provides top level communication and control functions as the device interfaces with the host device. In the case of a hardware processor, various logic circuit gates and other hardware circuit elements may be provided to carry out the various required functions such as in the form of a hardware state machine. In the case of a programmable processor, suitable programming instructions may be stored in a memory and executed by the processor as required to carry out the requisite functions.

Data from the host device is transferred for storage in the memory 104 responsive to a host write command, and returned back to the host from the memory responsive to a host read command. The memory can take a variety of forms, including rotatable storage media as set forth in FIG. 2.

Figure 2:
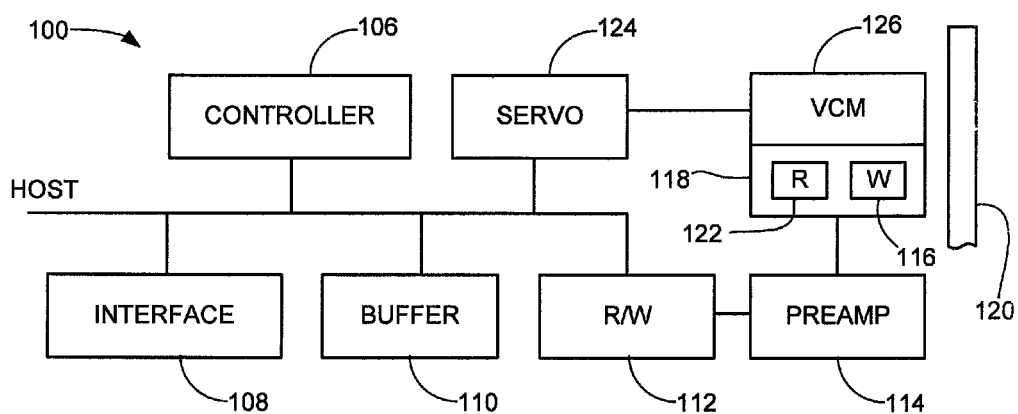
FIG. 2 is a schematic representation of aspects of the data storage device of FIG. 1 characterized as a hard disc drive (HDD) in accordance with some embodiments.

FIG. 2 is a generalized functional representation of the data storage device 100 of FIG. 1 in accordance with some embodiments. The internal architecture can vary as required so FIG. 2 is meant to convey a general overview of various systems, circuits and components. Other forms can be used.

The device 100 in FIG. 2 is characterized as a hard disc drive (HDD), although such is merely exemplary and is not limiting. Other forms of data storage devices can be used, such as but not limited to hybrid data storage devices that use rotatable media and solid state memory to store user data. The device includes a top level controller (control circuit) 106, which may correspond to the controller 102 in FIG. 1. A host interface circuit 108 provides communications with the external host under the direction of the controller 106, including the processing of data transfers, commands, status requests, etc. Data formatting operations and other functions may be executed by the interface as well. A buffer memory 110 provides for the temporary storage of user data pending transfer to/from the host, and may store other data as well such as control parameters, programming used by the controller 106, etc.

A read/write (R/W) channel circuit 112 provides signal conditioning during write and read operations. User data to be written by the device 100 are encoded by a write portion of the channel 112 such as via encryption, compression, run length limited (RLL) encoding, error detection and correction (EDC) encoding, etc. Encoded data are supplied to a preamplifier/driver (preamp) circuit 114 which applies bi-directional, time varying write currents to a write element (W) 116 of a data transducer 118. The write element 116 may take the form of a perpendicular write coil that writes a corresponding sequence of magnetic flux transitions to tracks defined on a rotatable recording medium (disc) 120.

During a read operation to recover previously written data, a read element (sensor) 122 of the transducer 118 detects the magnetic pattern to generate a readback signal that is preamplified and conditioned by the preamp 114 and forwarded to the channel 112. A read portion of the channel 112 applies signal processing to the recovered signal including detection, decoding, decryption, decompression, error detection and correction, etc. to output the originally stored data to the buffer 110. The interface 108 thereafter transfers the data to the requesting host. The read sensor 122 can take a variety of forms, such as a magneto-resistive (MR) sensor or the like.

A servo control circuit 124 operates to position the respective write and read elements 116, 122 adjacent the disc 120 during read and write operations. Servo data written to the disc 120 are detected by the read sensor 122, demodulated by the channel 112 and processed by the servo control circuit 124 to generate a position signal indicative of the radial position of the read sensor. A corresponding current command signal is input to a voice coil motor (VCM) 126 affixed to the transducer 118 to adjust the position of the transducer accordingly. It is contemplated that the VCM 126 and the transducer 118 are supported by a rotary swing-arm type actuator 128 which causes the transducer to take an arcuate path across the disc 120. Because of this path, as well as the fact that a gap exists between the respective write element 116 and read sensor 122, the transducer 118 may be positioned in slightly different locations when accessing a selected track for respective write and read operations.

Figure 3:
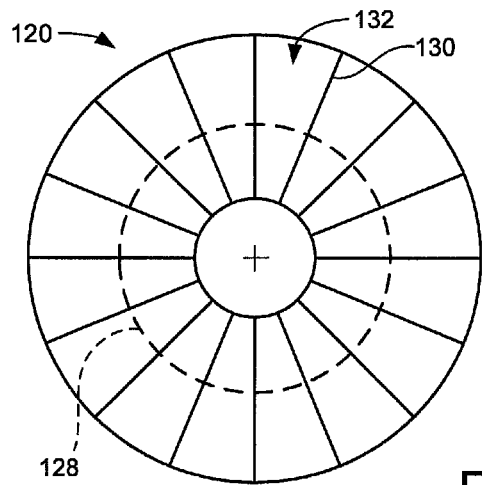
FIG. 3 shows a rotatable magnetic recording medium (disc) from FIG. 2.

FIG. 3 depicts the magnetic recording disc 120 from FIG. 2 in accordance with some embodiments. One exemplary track is denoted in broken line fashion at 128. In practice, adjacent tracks are provided across the media recording surface of the disc 120 from an outermost diameter (OD) to an innermost diameter (ID). Zone based recording (ZBR) techniques may be employed so that the tracks are arranged into concentric zones. In ZBR recording, the tracks 128 in each zone maybe written at a constant frequency, with a different selected frequency for each zone. This allows higher recording frequencies to be utilized adjacent the OD of the disc and lower recording frequencies adjacent the ID of the disc.

Servo data fields 130 are arranged in the form of spaced apart servo wedges that radially extend across the disc recording surfaces much like spokes on a wheel. The servo data fields 130 store the servo data utilized by the servo circuit 124 to provide positional control of the transducer(s) as discussed above in FIG. 2. While only a few servo fields 130 are shown in FIG. 3 for purposes of illustration, it will be understood that a larger number of servo fields will usually be provided per track, such as but not limited to about 200-400 servo fields per track. Data wedges, or gaps 132 are formed in the space between adjacent servo fields along each track.

Figure 4:
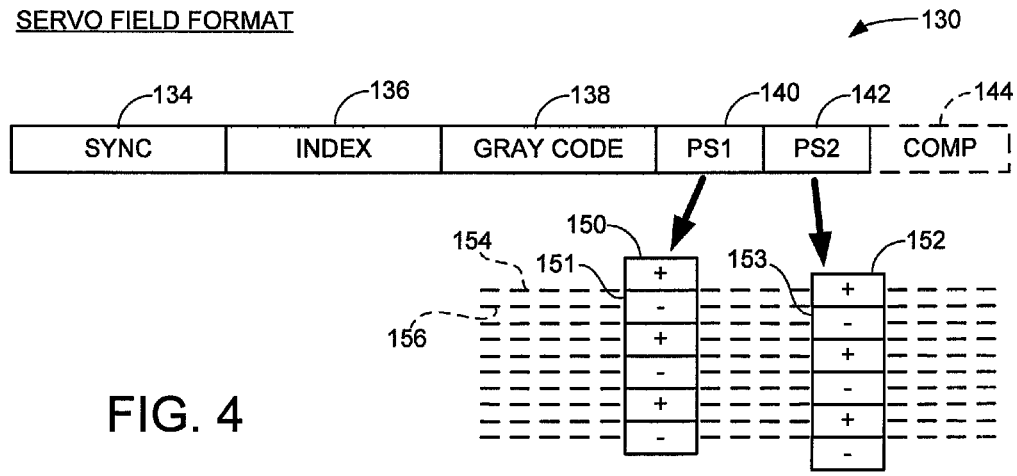
FIG. 4 shows an exemplary format for servo fields of the data track of FIG. 3.

FIG. 4 provides a generalized format for each of the servo fields 130 along each track 128. Other formats can be used. The exemplary format include a synchronization (sync) field 134, an index field 136, a Gray code (track ID) field 138, and servo positioning fields PS1 140 and PS2 142. One or more optional compensation (comp) fields 144 can be appended to at least certain ones of the servo fields 130 to store repeated run out (RRO) compensation values, or other data.

Generally, the sync field 134 is a unique bit sequence to signal to the servo circuit passage of a servo field 130 adjacent the transducer 114. The index field 136 signifies the angular position of the servo field, and the Gray code field 138 signifies the radial position of the servo field on the disc surface.

The PS1 and PS2 fields 140, 142 are alternating servo burst fields with variable polarities as shown. The PS1 fields 140 are each arranged as radially aligned positive (+) burst fields 150 and negative (−) burst fields 151. The PS2 fields 142 are similarly arranged as +burst fields 152 and −burst fields 153. Servo nulls 154 are defined at the juncture between each adjacent pair of the bursts 150, 151 in the PS1 fields 140, and servo nulls 156 are defined at the junction between each adjacent pair of the bursts 152, 153. In this way, accurate positioning of a given transducer 118 can be carried out by sensing the data in the respective servo fields.

Figure 5:
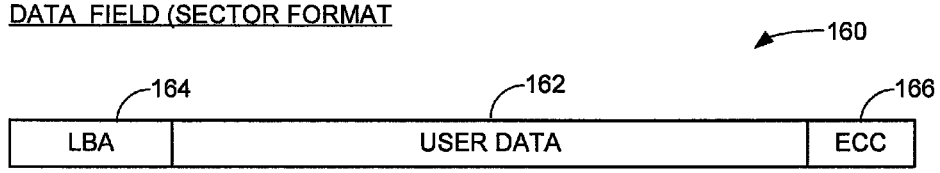
FIG. 5 shows an exemplary format for data fields (sectors) of the data track of FIG. 3.

An exemplary format for each of a number of fixed sized data sectors 160 is provided in FIG. 5. The data sectors 160 are defined in the gaps 132 between each adjacent pair of the servo fields (see FIG. 3). The format for the data sectors can vary, but each generally stores a fixed amount of user data in a user data field 162, such as 512 bytes or some other value. Header information such as a logical block address, LBA for the user data may be stored in field 164. Error correction codes (ECC) and other control data may be appended at the end of the data sector, as indicated by field 166. The ECC can be used to detect and correct up to selected numbers of errors in the user data during a read operation.

Figure 6:
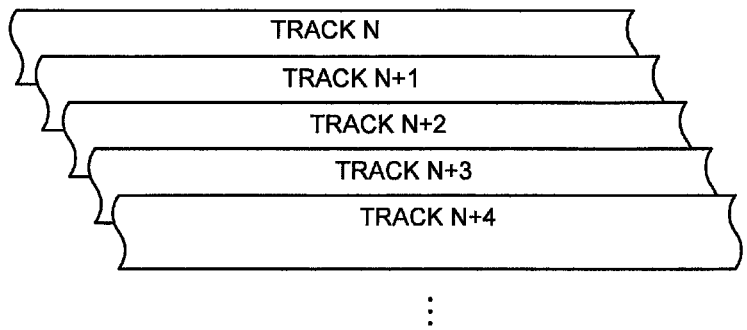
FIG. 6 illustrates a band of shingled magnetic recording (SMR) tracks written to the disc of FIG. 2 in accordance with various embodiments.

It is contemplated that in at least some embodiments, the tracks will be written using shingled magnetic recording (SMR) techniques, such as illustrated in FIG. 6. More particularly, FIG. 6 shows a number of data tracks 170 arbitrarily denoted as tracks N through N+4. Each successively written track (e.g., track N+1) is written so as to partially overlap a previously written track (e.g., track N). This allows the entire set of tracks to be written sequentially as a band. This provides certain format efficiencies from a data capacity standpoint, including the ability to place a greater number of data tracks on each disc surface.

Greater amounts of data streaming may be necessary to manage the data. For example, to update an intermediate track (e.g., track N+2), it may be necessary to read and temporarily buffer the data from tracks N+2 through N+4, update the data for track N+2, and then successively rewrite each of these tracks back to the media in turn. As a result, HDDs and other storage devices that employ SMR techniques tend to perform greater amounts of data streaming as compared to non-SMR devices.

FIG. 7 shows a portion of an exemplary data track 180 formatted in accordance with the related art. The data track 180 includes a number of features discussed above including servo fields 130, data wedges 132 and data sectors 160. In the example of FIG. 7, only two (2) data sectors 160 are shown between adjacent servo fields 130. It will be appreciated that generally, a larger number of data sectors may be accommodated in each wedge 132.

A number of additional fields are also shown in the data wedge 132. These additional fields include a gap after servo (GAS) field 182, a first preamble field 184, a first sync field 186, an inter-sector gap (ISG) field 188, a second preamble field 190, a second sync field 192, and a gap before servo (GBS) field 194. Other formats can be used. It will be appreciated that FIG. 7 is not to scale and the respective sizes of the fields are not necessarily indicated by their relative sizes in the figure. A direction of rotation of the media is indicated by arrow 196.

Generally, the GAS field 182 is a relatively short gap, on the order of perhaps a few symbol lengths, to provide a clear distinction between the end of the servo field 130 (e.g., the PS2 field or comp field) and the beginning of the first preamble (timing) field 184. The field 184 may be a 2T or other oscillating pattern at a selected frequency and amplitude to enable timing circuitry associated with the read/write channel 112 (FIG. 2) to establish an appropriate frequency for read and write operations upon the data sectors 160. The sync field 186 may provide additional timing inputs as well as a unique synchronization value to signal the head is proximate a data wedge. In some cases, both the preamble and sync fields may be referred to as a (consolidated) timing field, as desired.

The first user data sector 160 follows the sync field 186, as shown. Following the end of the first user data sector is the ISG field 188, which like the GAS field is a relatively short gap to separate the data sector from the second preamble (timing) field 188. The fields 190, 192 are nominally identical in form (if not length) to the fields 184, 186, and enable the timing circuitry to maintain frequency lock on the user data. The sync field further enables the system to clearly identify the boundary to the first bit in the second user data sector 160.

The GBS field 194 is another gap field to provide a clear distinction between the end of the second (or otherwise final) sector 160 in the data wedge. While FIG. 7 shows two complete sectors 160, a split sector may be provided at the end of the wedge just prior to the GBS, so that a first portion of the sector is provided ahead of the second servo field (servo field 2) 130 and a remaining, second portion of the sector follows the next occurrence of the respective GAS, timing and sync fields.

The pattern of FIG. 7 is generally repeated for each data wedge along the track 180, with user data sectors arrayed as required. Each data sector 160 is provided with its own leading ISG, timing and sync fields (e.g., 188, 190 and 192). As noted above, this provides a number of advantages, such as the ability to uniquely read or write individual sectors as required.

FIG. 8 shows a portion of another data track 200 formatted in accordance with various embodiments of the present disclosure. The data track 200 incorporates various data and control fields as discussed above, including an initial GAS field 182, preamble (timing) field 184 and sync field 186. However, after these fields, a number of data sectors 160 immediately follow and fill the remainder of the data wedge 132 down to the GBS field 194. The data sectors do not have inter-sector gaps, timing fields, or other data other than that provided in the individual data sectors (see e.g., FIG. 5).

For reference, three data sectors 160 are shown in the data wedge 132 illustrated in FIG. 8. The third and final data sector 160 is a partial data sector, with the remaining portion of the sector following servo field 2 (after the associated GAS, timing and sync fields).

Figure 9:
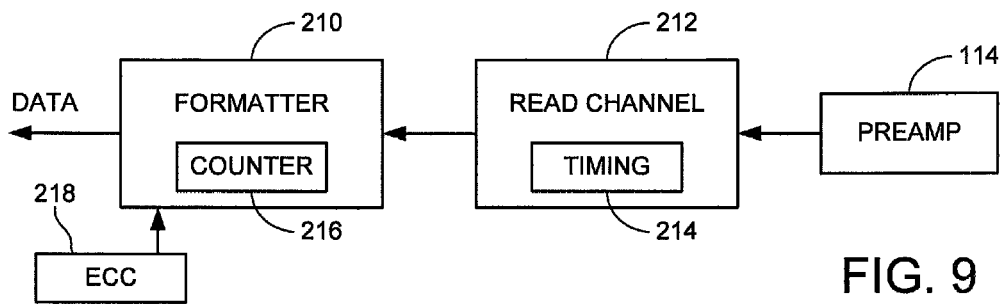
FIG. 9 is a functional block representation of timing and data recovery circuitry operative to recover data from the data track of FIG. 8 in some embodiments.

It can be seen that, in order to recover the user data from the various data sectors 160, additional processing is necessary by the data storage device 100. FIG. 9 is a functional block diagram of a formatter circuit 210 and a read channel 212 in accordance with some embodiments. The formatter circuit 210 may form a portion of the interface 108 and the read channel 212 may form a portion of the read/write channel 112 (FIG. 2). Other arrangements can be used, including incorporation of aspects of these elements elsewhere in the system.

The circuitry in FIG. 9 operates to recover timing data and user data during read operations. The read channel 212 includes a timing circuit 214 which may take the form of a voltage controlled oscillator (VCO), phase locked loop (PLL), etc. that responds to the detected oscillating timing information provided in the first (and only) timing field in the data wedge (e.g., 184 and/or 186, FIG. 8). This sets the recovery clock necessary to recover the successive data bits from the rest of the data wedge 132. Unlike the arrangement of FIG. 7, however, the timing circuit 214 is not reset or adjusted by an additional timing field within the data wedge 132.

The formatter utilizes a counter circuit 216 that counts data clock pulses at the commencement of each sector boundary. For example, if each data sector is established to be 520 total bytes (see e.g., FIG. 5), then the counter tracks and resets the beginning of each sector to enable the formatter to identify the boundary. The formatter thus relies on the counter to denote the sector boundaries, and provide the requested data to the host.

It will be noted at this point that, should a read request be provided by a host device to return the data from the second sector (data sector 2) 160 in FIG. 8, the circuitry of FIG. 9 will recover all of the data bits beginning with data sector 1, count to the beginning of data sector 2, discard the data from data sector 1 and forward the data from data sector 2. The data bits recovered from the wedge may be retained until an ECC circuit 218 has successfully detected no bit errors in the data bits associated with the requested sector; should one or more uncorrectable errors be detected, further processing may be employed including recalculations (free retries), adjustments in the bit (symbol) boundaries, or a rereading of the entire data wedge.

Referring again to FIG. 7, the intermediate control fields such as fields 188, 190 and 192 are not excessively large on an individual basis. However, since such are provided for substantially every data sector on the track 180, the space can add up, particularly when several hundred data sectors are provided on the track. It has been found that, based on format, the arrangement 200 in FIG. 8 can provide a few additional sectors, such as on the order of 5-6 additional sectors or more, on each track. This can result in a significant increase in the total available data storage capacity of the device.

Figure 10:
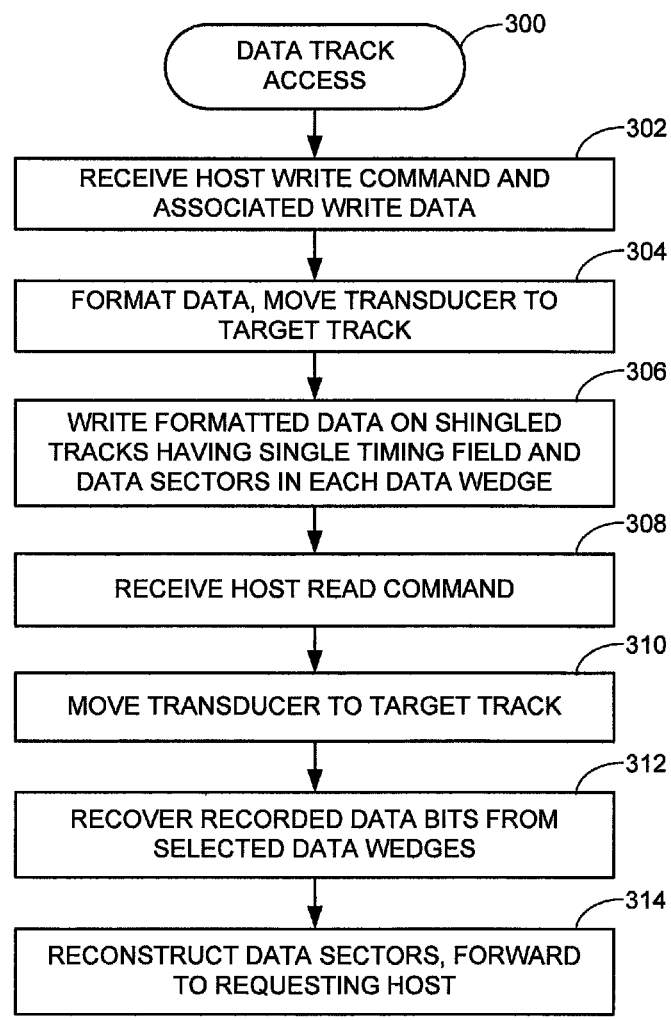
FIG. 10 is a data track access routine illustrative of steps carried out by the data storage device in accordance with various embodiments.

FIG. 10 is a flow chart for a data access routine 300 to summarize the foregoing discussion. It is contemplated that the various steps in FIG. 10 are merely exemplary and can be omitted, modified, performed in a different order, etc. as required. The various steps are contemplated as being carried out under the direction of the controller 106 using appropriate circuit elements such as the formatter and read channel aspects from FIG. 9.

The routine commences at step 302 with the receipt of a host write command and associated write data to be written to the media 120. This can be received in a variety of ways, and will likely be in accordance with a given host interface protocol (e.g., SAS, Ethernet, Fibre Channel, etc.). The writeback data are temporarily buffered in a suitable memory location (such as buffer 110) and once the data are processed, the write command is forwarded for scheduling to satisfy the request. The controller may employ a deep queue approach so that many pending commands are present and a command execution strategy is implemented to achieve efficient execution of the commands in an order that takes into account rotational latencies and radial position of the associated transducers 122.

At step 304, the data are formatted for writing, including application of appropriate encoding such as run length limited (RLL) encoding, encryption, data compression, ECC calculations, etc. A target location is identified and the transducer associated with the target location is moved via a seek operation to place the transducer onto the target track.

As shown by step 306, the data are thereafter written to the target location. It is contemplated that this process may employ shingled magnetic recording. During this step the system tracks the angular position of the rotating media and detects the servo field 130 that immediately precedes the target wedge 132 (e.g., servo field 1 in FIG. 8). It will be appreciated that, based on reader/writer angular offsets, the read element may in fact be located over an adjacent track in order to align the write element with the target track, which can be performed in a known manner. As desired, the write element may write the first timing field and sync field (e.g., 182, 184 in FIG. 8) followed by the streaming of write data (user data) to the following data sectors in succession. Depending upon the size of the input data, multiple successive data wedges on the same track, and multiple shingled tracks, may be written during this step to write the entirety of the data to the disc.

At this point it will be noted that, generally, new data will be written at the beginning of each data wedge. That is, a write operation to write a new sector of data will commence in the location identified as data sector 1, since no intersector gaps or other intermediate control information or fields are provided to physically separate the sectors. This is not a significant issue since the system can accumulate and write large blocks of data at a time to SMR tracks to form individual bands. Thus, in some embodiments write data will continue to be accumulated (within reasonable limits) until a specified set size of writeback data have been obtained, after which the data are efficiently transferred to the SMR tracks. Writeback caching can be used to notify the host of a command complete status even if the data have not yet been transferred to the disc. Writeback caching policies, including the use of non-volatile storage (e.g., flash, etc.) can further be used to accumulate the data.

The flow of FIG. 10 continues at step 308 where a host read command is subsequently received to retrieve the previously written data. It is contemplated that sufficient time has lapsed since the data were written such that the read command is to be serviced from the rotatable media rather than, for example, a cache hit from local volatile (e.g., DRAM) or non-volatile (e.g., flash) memory.

The read command is processed at step 310 in the queue and, when executed, results in a seek operation to move the read element of the transducer to the target track on which the desired sector or sectors are stored. The recorded data bits are retrieved at step 312 from the associated data wedge(s) having the desired sector(s). As discussed above in FIG. 9, this may include detection of the leading servo field 130 (servo field 1), followed by timing acquisition (fields 184/186) and streaming of the data bits from the media. A counter or other tracking mechanism counts the channel clock bits to denote sector boundaries and the data sectors are reconstructed and forwarded to the requesting host, step 314.

It will now be appreciated that the various embodiments presented herein can provide a number of benefits. Providing a single timing recovery field per data wedge and elimination of inter-sector gaps can remove unnecessary and space consuming fields that can instead be utilized for the storage of additional user data. The techniques disclosed herein are particularly suitable for shingled magnetic recording (SMR) techniques, although such are not necessarily required.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a rotatable data recording medium having a circumferentially extending data track formed from spaced apart embedded servo wedges that extend radially across a recording surface of the medium to define intervening data wedges between each adjacent pair of the servo wedges, each data wedge along the data track having only a single timing field at a beginning portion of the data wedge immediately adjacent a first servo wedge and comprising an alternating pattern at a selected frequency, followed by a plurality of data sectors that extend across the data wedge to an end portion of the data wedge immediately adjacent a second servo wedge with no intersector gaps between the respective data sectors and no additional timing fields between the first and second servo wedges.

2. The apparatus of claim 1, wherein the medium is characterized as a magnetic recording disc comprising a plurality of data tracks nominally identical to the data track, the plurality of data tracks characterized as shingled magnetic recording (SMR) tracks so that each successively written data track partially overlaps a previously written data track.

3. The apparatus of claim 1, further comprising a timing circuit that establishes a data clock at a selected frequency responsive to a timing field readback signal obtained from the single timing field at the beginning portion of the data wedge, the data clock used to write user data to or read data from the plurality of data sectors that extend across the data wedge.

4. The apparatus of claim 3, further comprising a counter circuit that initiates a count of channel clock bits in a user data readback signal obtained from the data sectors, the count used to denote data sector boundaries.

5. The apparatus of claim 1, further comprising a moveable data read/write transducer configured to be positioned adjacent the data track to write data to and read data from the plurality of data sectors responsive to timing information associated with the timing field.

6. The apparatus of claim 1, wherein the data wedge between each adjacent pair of first and second servo wedges along the data track comprises a gap after servo (GAS) field to physically separate the first servo wedge from the timing field, and a gap before servo (GBS) field to physically separate the last data sector in the plurality of data sectors from the second servo wedge.

7. The apparatus of claim 1, wherein each servo wedge comprises a plurality of adjacent servo fields, each servo field comprising a timing field, an index field indicative of angular position of the servo field, a track address field indicative of radial position of the servo field, and servo bursts to provide intra-track positional information to a servo control circuit adapted to position a read/write transducer adjacent the data track.

8. The apparatus of claim 1, wherein each of the plurality of data sectors comprises a header field, a user data field and an error correction code (ECC) field, wherein no oscillating timing patterns are included within the data sectors.

9. The apparatus of claim 1, wherein the timing field comprises an oscillating 2T timing pattern at a selected frequency nominally corresponding to a frequency at which user data are recorded to the plurality of data sectors.

10. A data storage device, comprising:
a rotatable data recording medium on which is defined a plurality of concentric data tracks, each track having a plurality of spaced apart servo fields and a data wedge between each adjacent pair of the servo fields;
a data read/write transducer adjacent the medium having separate read and write elements; and
a control circuit configured to direct, via the transducer, a writing of user data to and a reading of user data from a plurality of data sectors defined in each servo wedge, the control circuit comprising a timing recovery circuit configured to establish a data transfer clock at a selected frequency responsive to a fixed frequency timing pattern stored in a single timing field in each data wedge, each of the data sectors in each data wedge immediately following the timing field being immediately adjacent with no intersector gaps between the respective data sectors and no additional timing fields between the first and second servo fields.

11. The data storage device of claim 10, wherein the control circuit further comprises a counter circuit configured to count channel clock bits from the data transfer clock to identify data sector boundaries responsive to a total number of channel clock bits corresponding to a fixed size of each of the data sectors.

12. The data storage device of claim 10, wherein the medium is a magnetic recording disc.

13. The data storage device of claim 10, wherein the concentric data tracks are shingled magnetic recording (SMR) tracks.

14. The data storage device of claim 10, wherein the data wedge between each adjacent pair of first and second servo wedges along the data track comprises a gap after servo (GAS) field to physically separate the first servo wedge from the timing field, and a gap before servo (GBS) field to physically separate the last data sector in the plurality of data sectors from the second servo wedge.

15. The data storage device of claim 10, wherein each servo field comprises a timing field, an index field indicative of angular position of the servo field, a track address field indicative of radial position of the servo field, and servo bursts to provide intra-track positional information to a servo control circuit adapted to position the read/write transducer adjacent the data track.

16. The data storage device of claim 10, wherein each of the plurality of data sectors comprises a header field, a user data field and an error correction code (ECC) field, wherein no oscillating timing patterns are included within the data sectors.

17. The data storage device of claim 10, wherein the timing field comprises an oscillating 2T timing pattern at a selected frequency nominally corresponding to a frequency at which user data are recorded to the plurality of data sectors.

18. A method comprising writing user data to a data track on a rotating data recording medium in a plurality of immediately adjacent fixed sized user data sectors in a data wedge along the data track between an adjacent pair of servo fields, the data wedge having only a single timing field with a oscillating pattern at a selected frequency between the adjacent pair of servo fields, the user data sectors immediately adjacent one another without intersector gaps formed therebetween and formed of data bits written at the selected frequency.

19. The method of claim 18, further comprising subsequently reading user data from the data sectors by reading the oscillating pattern from the single timing field to establish a read clock, using the read clock to detect data bits from the data sectors, and using a counter that counts pulses in the read clock to identify sector boundaries.

20. The method of claim 19, wherein the reading step further comprises reading all of the plurality of sectors in a selected data wedge, discarding a first sector from the plurality of sectors and transferring a subsequent, second sector to a host device.

* * * * *